United States Patent
Tailor et al.

(10) Patent No.: US 9,204,357 B1
(45) Date of Patent: Dec. 1, 2015

(54) SYSTEMS AND METHODS OF ACCESS NODE SELECTION

(71) Applicant: Sprint Spectrum LP, Overland Park, KS (US)

(72) Inventors: Pinalkumari Tailor, Ashburn, VA (US); Mohammad Ghaus, Ashburn, VA (US)

(73) Assignee: Sprint Spectrum L.P., Overland Park, KS (US)

(*) Notice: Subject to any disclaimer, the term of this patent is extended or adjusted under 35 U.S.C. 154(b) by 130 days.

(21) Appl. No.: 14/015,959

(22) Filed: Aug. 30, 2013

(51) Int. Cl.
*H04W 4/00* (2009.01)
*H04W 36/30* (2009.01)

(52) U.S. Cl.
CPC .................................. *H04W 36/30* (2013.01)

(58) Field of Classification Search
CPC ...................................................... H04W 36/30
USPC ................................... 370/331; 455/436–444
See application file for complete search history.

(56) References Cited

U.S. PATENT DOCUMENTS

| | | | |
|---|---|---|---|
| 5,790,528 A * | 8/1998 | Muszynski | 370/331 |
| 2009/0215452 A1 | 8/2009 | Balasubramanian et al. | |
| 2013/0178216 A1 * | 7/2013 | Chang et al. | 455/437 |

* cited by examiner

*Primary Examiner* — Mang Yeung (57) ABSTRACT

In systems and methods of access node selection, signal level criteria and a signal quality criteria are provided, and a received signal level and a received signal quality are determined based on a signal from the access node to the wireless device. An application requirement is determined of an application running on the wireless device. Based on a comparison of the received signal level and the signal level criteria, a comparison of the received signal quality and the signal quality criteria, and the application requirement, the wireless device is instructed to perform an initial access procedure with the access node.

19 Claims, 6 Drawing Sheets

SYSTEMS AND METHODS OF ACCESS NODE SELECTION

SYSTEMS AND METHODS OF ACCESS NODE SELECTION

TECHNICAL BACKGROUND

To establish communication between a wireless device and a communication network, typically a process of access point or access node selection is performed before an initial network entry process is performed with the communication network. When establishing communication with a new network, or when reselecting an access point by a wireless device in an idle mode, typically an assessment of a received signal level from one or more access nodes is performed by the wireless device, and based on the assessment an access node is selected for wireless communication. However, other aspects of a wireless communication link, such as signal quality, available bandwidth, achievable data rate, and the like, may be insufficient for the communication link with the access node to meet a required level of communication services for the wireless device. The result can be a failure to establish a communication session and forced access node reselection, causing delay in establishing network communication for the wireless device.

OVERVIEW

Systems and methods of access node selection are provided. In operation, a signal level criteria and a signal quality criteria are provided from an access node to a wireless device. An application requirement is determined of an application running on the wireless device. Based on a signal from the access node to the wireless device, a received signal level and a received signal quality are determined. Based on a comparison of the received signal level and the signal level criteria, a comparison of the received signal quality and the signal quality criteria, and the application requirement, the wireless device is instructed to perform an initial access procedure with the access node.

DETAILED DESCRIPTION

Figure 1:
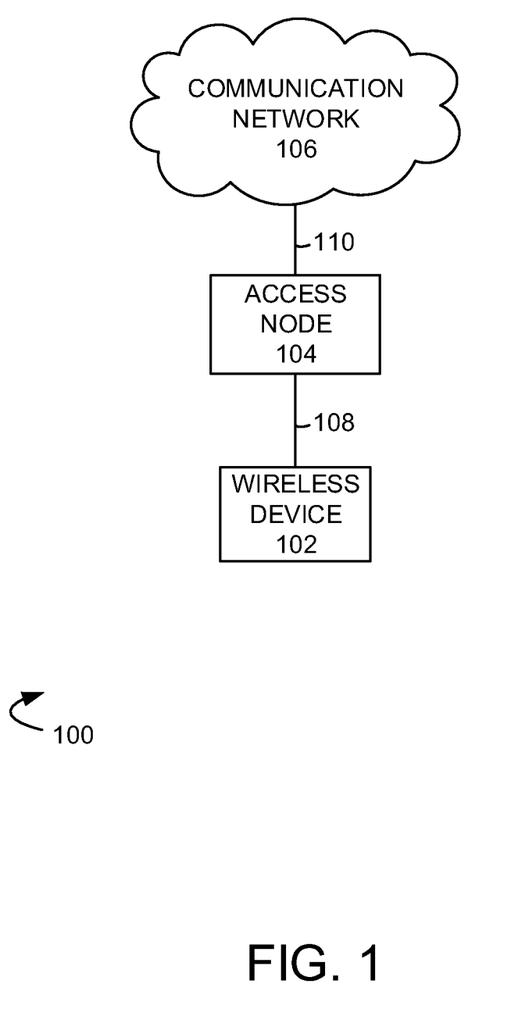
FIG. 1 illustrates an exemplary communication system of access node selection.

FIG. 1 illustrates an exemplary communication system 100 of access node selection comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

When a wireless device powers up, or when a wireless device in idle mode performs access node reselection, typically the wireless device performs an evaluation of available access nodes and selects an access node. Prior to access node selection, a wireless device may perform initial operations such as scanning for a downlink channel and performing downlink synchronization, obtaining control channel and shared channel resource information, and the like. Then, based on an assessment of a received signal level an access node is selected for wireless communication. However, other aspects of a wireless communication link, such as signal quality, available bandwidth, achievable data rate, and the like, may be insufficient for the communication link with the access node to meet a required level of communication services for the wireless device. For example, while a received signal level may appear from the perspective of the wireless device to meet a required signal level, another aspect of the communication link, such as received signal quality, may not meet the communication needs of an application running on the wireless device. As a result, an access node can be selected for communication, and the wireless device can then experience a network entry failure. The wireless device must then scan for a new access node for a new attempt at establishing network communication, which introduces delay in establishing network communication for the wireless device.

In operation, a signal level criteria and a signal quality criteria are provided. The signal level and signal quality criteria can be provided from access node 104 to wireless device 102, or they can be provided from another network element of communication system 100 to access node 104. An application requirement is determined of an application running on wireless device 102, and a received signal level and a received signal quality are determined based on a signal from access node 104 to wireless device 102. For example, wireless device 102 can determine the received signal level and received signal quality, and can report the received signal level and received signal quality to access node 104. Based on a comparison of the received signal level and the signal level criteria, a comparison of the received signal quality and the signal quality criteria, and the application requirement, wireless device 102 is instructed to perform an initial access procedure with access node 104.

Figure 2:
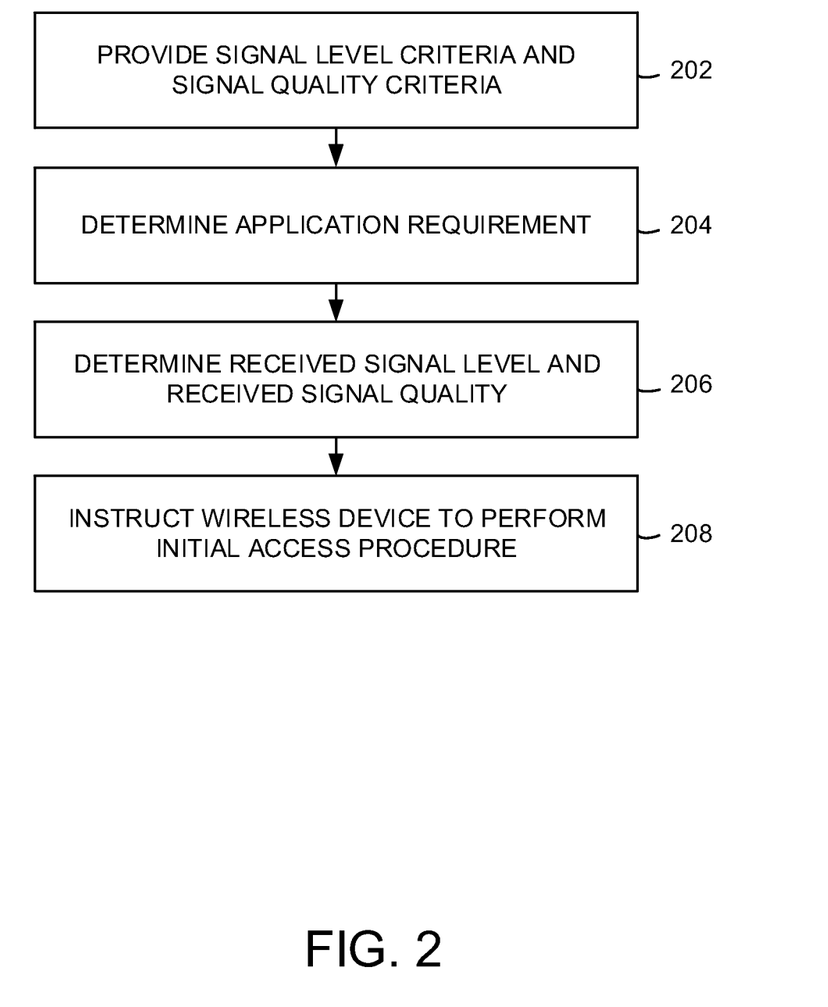
FIG. 2 illustrates an exemplary method of access node selection.

FIG. 2 illustrates an exemplary method of access node selection. In operation 202, a signal level criteria and a signal quality criteria are provided. The signal level criteria and signal quality criteria can be provided, for example, from access node 104 to wireless device 102, or they can be provided from another network element of communication system 100 to access node 104. The signal level criteria can comprise, for example, a minimum signal strength measurement, such as a signal to noise ratio (SNR), a signal to interference plus noise ratio (SINR), a carrier to interference plus noise ratio (CINR), a received signal strength indicator (RSSI), a reference signal received power (RSRP), and the like. The signal quality criteria can comprise a channel quality indicator (CQI), a reference signal received quality (RSRQ), a received signal quality indicator (RSQI), and the like.

Next, an application requirement is determined of an application running on a wireless device (operation 204). For example, an application requirement can be determined of an application running on wireless device 102. The application requirement can comprise a minimum data rate, a maximum permitted data delay, a minimum throughput, a maximum error rate, a maximum data loss rate, and the like, which can be required by the application running on wireless device 102 to achieve a minimum level of performance. The application requirement can also be determined based on the application type, such as whether the application is a relatively delay sensitive application (such as a streaming audio application, a streaming video application, a voice application, and the like) or a relatively delay insensitive application (such as an email application, a messaging application, a web browsing application, and the like). Further, the application requirement can be based on a traffic class indicator associated with the application, such as a quality of service class indicator (QCI) or similar traffic class indicator.

In operation 206, a received signal level and a received signal quality are determined based on a signal from the access node to the wireless device. For example, a received signal level and a received signal quality can be determined based on a signal from access node 104 to wireless device 102. Wireless device 102 can determine the received signal level and received signal quality, and can report the received signal level and received signal quality to access node 104.

Based on a comparison of the received signal level and the signal level criteria, a comparison of the received signal quality and the signal quality criteria, and the application requirement, the wireless device is instructed to perform an initial access procedure with the access node (operation 208). For example, wireless device 102 can be instructed to perform an initial access procedure with access node 104 based on a comparison of the received signal level and the signal level criteria, a comparison of the received signal quality and the signal quality criteria, and the application requirement. The comparison can be performed by wireless device 102, or by access node 104 when wireless device 102 reports the received signal strength and received signal quality to access node 104. The comparison can also be performed by another network element of communication system 100.

Figure 3:
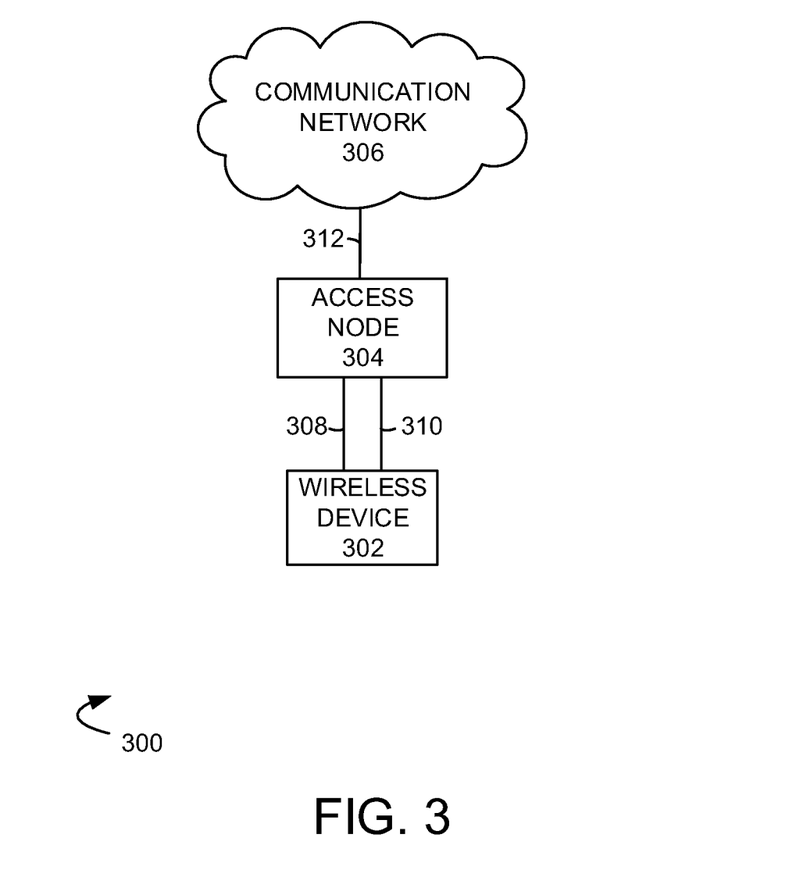
FIG. 3 illustrates another exemplary communication system of access node selection.

FIG. 3 illustrates another exemplary communication system 300 of access node selection comprising wireless device 302, access node 304, and communication network 306. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication links 308 and 310. Each of communication links 308 and 310 can use a different radio access technology, wherein communication link 308 comprises a first radio access technology and communication link 310 comprises a second radio access technology. The first radio access technology can comprise a higher speed radio access technology than the second radio access technology. For example, the first radio access technology can comprise WiMAX, LTE, LTE-Advanced, or another so-called fourth generation (4G) radio access technology, and the second radio access technology can comprise CDMA, EV-DO, 1×RTT, GSM, or another so-called third generation (3G) radio access technology.

Access node 304 is a network node capable of providing wireless communications to wireless device 302, and can be, for example, a base transceiver station, a radio base station, an eNodeB device, or an enhanced eNodeB device. Access node 304 is in communication with communication network 306 over communication link 312.

Communication network 306 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 306 can be capable of carrying voice information and other data, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 306 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 306 may also comprise a wireless network, including base stations, wireless communication nodes, telephony switches, internet routers, network gateways, computer systems, communication links, or some other type of communication equipment, and combinations thereof.

Communication links 308 and 310 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 304 and communication network 306 which are omitted for clarity, including additional processing nodes, routers, gateways, and physical and/or wireless data links for carrying data among the various network elements.

Figure 4:
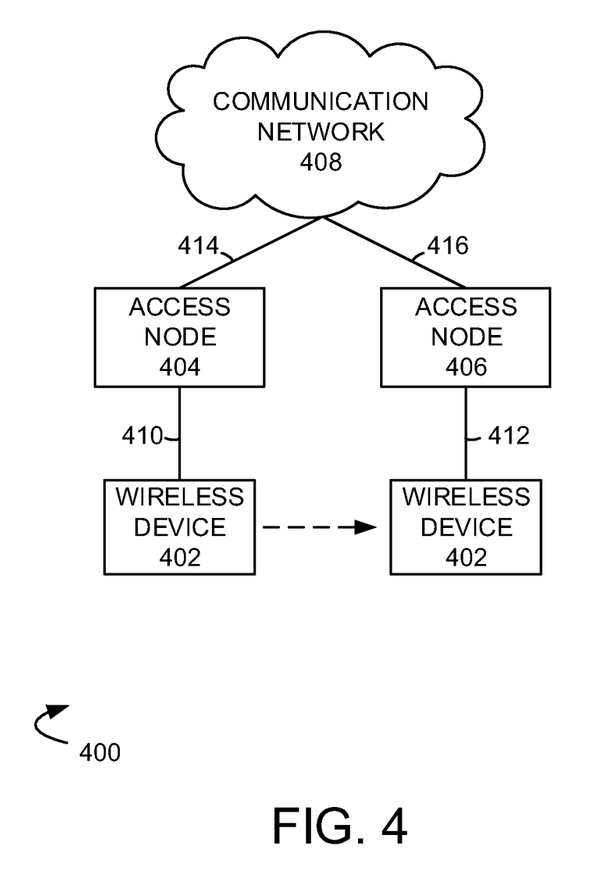
FIG. 4 illustrates another exemplary communication system of access node selection.

FIG. 4 illustrates another exemplary communication system 400 of access node selection comprising wireless device 402, access node 404, access node 406, and communication network 408. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 410 and with access node 406 over communication link 412. Each of communication links 410 and 412 can use a different radio access technology, wherein communication link 410 comprises a first radio access technology and communication link 412 comprises a second radio access technology. The first radio access technology can comprise a higher speed radio access technology than the second radio access technology. For example, the first radio access technology can comprise WiMAX, LTE, LTE-Advanced, or another so-called fourth generation (4G) radio access technology, and the second radio access technology can comprise CDMA, EV-DO, 1×RTT, GSM, or another so-called third generation (3G) radio access technology.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with communication network 408 over communication link 414, and access node 406 is in communication with communication network 408 over communication link 416.

Communication network 408 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 408 can be capable of carrying voice information and other data, for example, to support communications by a wireless device such as wireless device 402. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 408 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 408 may also comprise a wireless network, including base stations, wireless communication nodes, telephony switches, internet routers, network gateways, computer systems, communication links, or some other type of communication equipment, and combinations thereof.

Communication links 410, 412, 414 and 416 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, access node 406 and communication network 408 which are omitted for clarity, including additional processing nodes, routers, gateways, and physical and/or wireless data links for carrying data among the various network elements.

Figure 5:
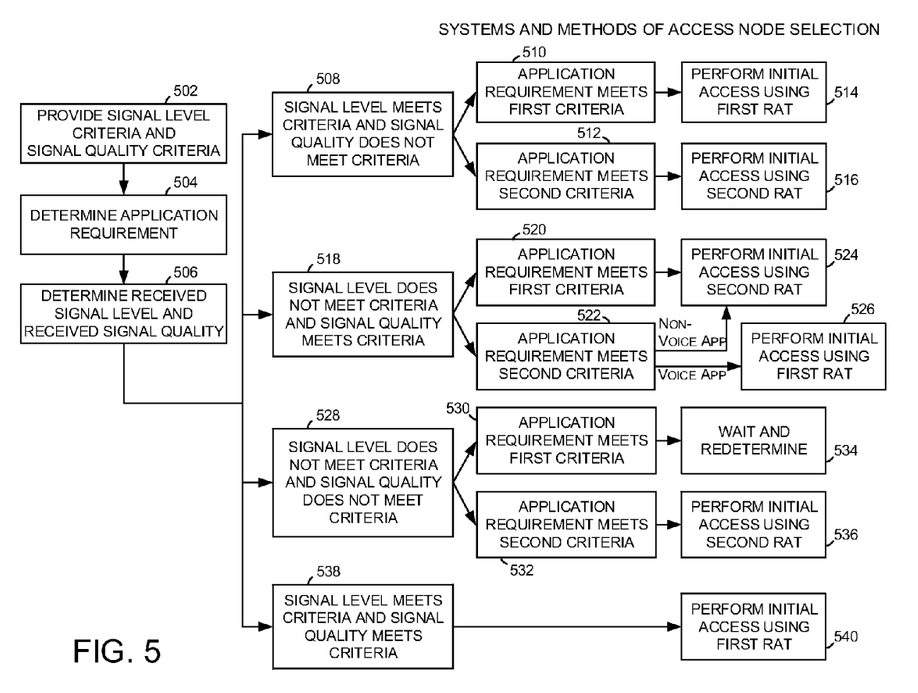
FIG. 5 illustrates another exemplary method of access node selection.

FIG. 5 illustrates another exemplary method of access node selection. In operation 502, a signal level criteria and a signal quality criteria are provided. The signal level and signal quality criteria can be provided, for example, from access node 304 to wireless device 302, or they can be provided from another network element of communication system 300 to access node 304. Similarly, the signal level and signal quality criteria can be provided from access node 404 to wireless device 402, or they can be provided from another network element of communication system 400 to access node 404. The signal level criteria can comprise a predetermined signal level, such as a Qrxlevmin value or a similar value which can be determined by, or provided by, the communication system. The signal level criteria can further comprise a minimum signal strength measurement, such as a signal to noise ratio (SNR), a signal to interference plus noise ratio (SINR), a carrier to interference plus noise ratio (CINR), a received signal strength indicator (RSSI), a reference signal received power (RSRP), and the like. The signal quality criteria can comprise a predetermined signal quality, such as a Qqualmin value or similar value which can be determined by, or provided by, the communication system. The signal quality criteria can further comprise a channel quality indicator (CQI), a reference signal received quality (RSRQ), a received signal quality indicator (RSQI), and the like.

Next, an application requirement is determined of an application running on a wireless device (operation 504). For example, an application requirement can be determined of an application running on wireless device 302 or on wireless device 402. The application requirement can comprise a minimum data rate, a maximum permitted data delay, a minimum throughput, a maximum error rate, a maximum data loss rate, and the like, which can be required by the application running on wireless device 302 (or 402) to achieve a minimum level of performance. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). Further, the application requirement can be based on a traffic class indicator associated with the application, such as a quality of service class indicator (QCI) or similar traffic class indicator.

In operation 506, a received signal level and a received signal quality are determined based on a signal from the access node to the wireless device. For example, a received signal level and a received signal quality can be determined based on a signal from access node 304 to wireless device 302, or from access node 404 to wireless device 402. Wireless device 302 (or 402) can determine the received signal level and received signal quality, and can report the received signal level and received signal quality to access node 304 (or 404).

Based on a comparison of the received signal level and the signal level criteria, a comparison of the received signal quality and the signal quality criteria, and the application requirement, the wireless device can be instructed to perform an initial access procedure using a first radio access technology or using a second radio access technology. When the received signal level meets the signal level criteria and the signal quality does not meet the signal quality criteria (operation 508), then the wireless device can be instructed to perform an initial network entry procedure using a first radio access technology or a second radio access technology based on the application requirement. For example, the received signal level can meet or exceed a minimum signal level, and the received signal quality can be less than a minimum signal quality, which may indicate that while a signal level of a communication link (or a communication link using a certain radio access technology) is sufficient to support certain types of wireless communication, the signal quality of the communication link is insufficient to support certain types of wireless communication. An application requirement can meet a first criteria when the application requirement is relatively delay insensitive, and the application requirement can meet a second criteria when the application requirement is relatively delay sensitive.

When the received signal level meets or exceeds a minimum signal level, and the received signal quality is less than a minimum signal quality, and the application requirement meets the first application requirement criteria (operation 510), the wireless device is instructed to perform an initial access procedure with the access node using a first radio access technology (operation 514). The first radio access technology can comprise WiMAX, LTE, LTE-Advanced, or another so-called fourth generation (4G) radio access technology. When the received signal level meets or exceeds a minimum signal level, and the received signal quality is less than a minimum signal quality, and the application requirement meets the second application requirement criteria (operation 512), the wireless device is instructed to perform an initial access procedure with the access node using a second radio access technology (operation 516). The second radio access technology can comprise CDMA, EV-DO, 1×RTT, GSM, or another so-called third generation (3G) radio access technology. A relatively high signal level and a relatively low signal quality can support delay insensitive application requirements using the first radio access technology, while wireless devices comprising delay sensitive application requirements can be instructed to use the second radio access technology. The first and second radio access technologies can be used by two communication links of an access node, such as communication links 308 and 310 (FIG. 3). Additionally, or alternatively, as illustrated in FIG. 4, the first radio access technology can be used by a first access node (e.g., access node 404), and the second radio access technology can be used by a second access node (e.g., access node 406). When a wireless device is instructed to use the second radio access technology, the instruction can comprise the performance of a handover to the second access node.

When the received signal level does not meet the signal level criteria and the signal quality meets the signal quality criteria (operation 518), then the wireless device can be instructed to perform an initial network entry procedure using a first radio access technology or a second radio access technology based on the application requirement and the application type. For example, when the received signal level is less than a minimum signal level, and the received signal quality meets or exceeds a minimum signal quality, and the application requirement meets the first application requirement criteria (operation 520), the wireless device is instructed to perform an initial access procedure with the access node using the second radio access technology (operation 524). When the received signal level is less than a minimum signal level, and the received signal quality meets or exceeds a minimum signal quality, and the application requirement meets the second application requirement criteria (operation 522), the application type is determined. When the application is a voice application (such as a Voice over Internet Protocol (VoIP) application, a Voice over LTE (VoLTE) application, and the like), the wireless device is instructed to perform an initial access procedure with the access node using the first radio access technology (operation 526). When the application is a non-voice application, the wireless device is instructed to perform an initial access procedure with the access node using the second radio access technology (operation 524). In such a case, the received signal quality of the communication link can support voice applications using the first radio access technology, while the received signal level can be deemed insufficient to support non-voice communications, or applications comprising requirements meeting the first application requirement criteria.

When the received signal level does not meet the signal level criteria and the signal quality does not meet the signal quality criteria (operation 528), then the wireless device can be instructed to wait, or to perform an initial network entry procedure using the second radio access technology based on the application requirement. When the received signal level does not meet the signal level criteria and the signal quality does not meet the signal quality criteria, and the application requirement meets the first application requirement criteria (operation 530), the wireless device is instructed to not perform an initial access procedure with the access node. Alternatively, the wireless device can be prevented from performing an initial access procedure, for example, by blocking or not accepting an initial access request. The wireless device can further be instructed to redetermine the received signal level, received signal quality, and/or the application requirement at a future time, or after a period of time. When the received signal level does not meet the signal level criteria and the signal quality does not meet the signal quality criteria, and the application requirement meets the second application requirement criteria (operation 532), the wireless device is instructed to perform an initial access procedure with the access node using the second radio access technology (operation 536).

When the received signal level meets the signal level criteria and the signal quality meets the signal quality criteria (operation 538), the wireless device is instructed to perform an initial access procedure with the access node using the first radio access technology, whether the application requirement meets the first or second application requirement criteria. In such case, the communication link can be determined capable of supporting any type of application requirement based on the received signal level and the received signal quality.

Figure 6:
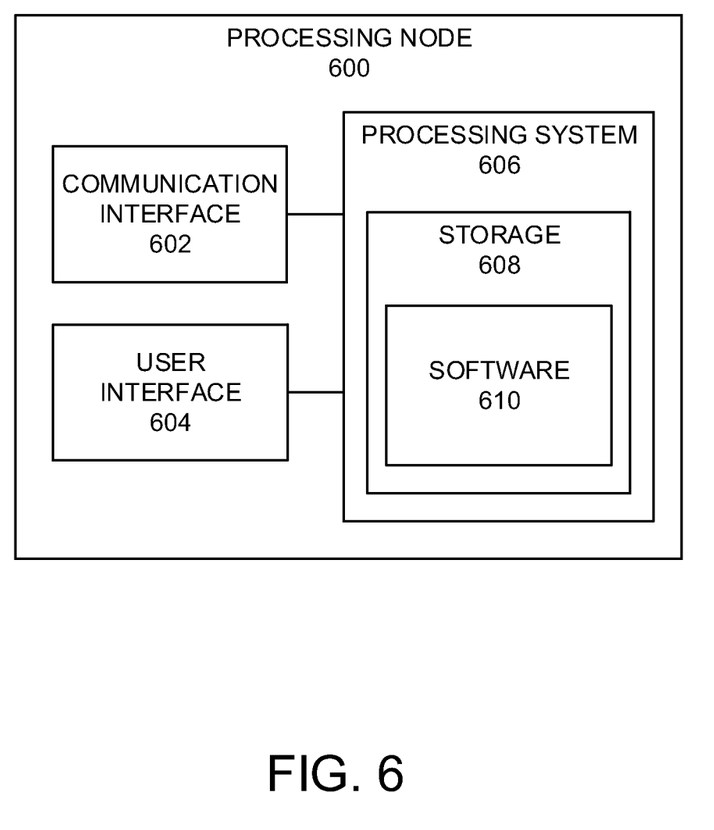
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to select an access node for wireless communication by a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 304, access node 404 and access node 406. Processing node 600 can also be an adjunct or component of a network element, such as an element of an access node. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of an access node selection for wireless communication, comprising:
providing a signal level criterion and a signal quality criterion from an access node to a wireless device, wherein the wireless device is capable of performing an initial access procedure with the access node using a first radio access technology and a second radio access technology;
determining a first application requirement criterion and a second application requirement criterion of an application running on the wireless device;
determining a received signal level and a received signal quality based on a signal from the access node to the wireless device; and
instructing the wireless device to perform an initial access procedure with the access node based on a comparison of the received signal level and the signal level criterion, a comparison of the received signal quality and the signal quality criterion, and the application requirement criteria, wherein the access node selects the first radio access technology or the second radio access technology to perform the initial access procedure based on a result of the comparisons and the determined application requirement criteria.

2. The method of claim 1, further comprising:
instructing the wireless device to perform the initial access procedure with the access node using the first radio access technology when the received signal level meets the signal level criterion, the received signal quality does not meet the signal quality criterion, and an application requirement of the application meets the first application requirement criterion.

3. The method of claim 1, further comprising:
instructing the wireless device to perform the initial access procedure with the access node using the second radio access technology when the received signal level meets the signal level criterion, the received signal quality not meet the signal quality criterion, and an application requirement of the application meets the second application requirement criterion.

4. The method of claim 1, further comprising:
instructing the wireless device to perform the initial access procedure with the access node using the second radio access technology when the received signal level does not meet the signal level criterion, the received signal quality meets the signal quality criterion, and an application requirement of the application meets the first application requirement criteria.

5. The method of claim 1, further comprising:
instructing the wireless device to perform the initial access procedure with the access node using the second radio access technology when the received signal level does not meet the signal level criterion, the received signal quality meets the signal quality criterion, an application requirement of the application meets the second application requirement criterion,
wherein the application running on the wireless device is a non-voice application.

6. The method of claim 1, further comprising:
instructing the wireless device to perform the initial access procedure with the access node using the first radio access technology when the received signal level does not meet the signal level criterion, the received signal quality meets the signal quality criterion, and an application requirement of the application meets the second application requirement criterion,
wherein the application running on the wireless device is a voice application.

7. The method of claim 1, further comprising:
instructing the wireless device to not perform the initial access procedure with the access node when the received signal level does not the signal level criterion, the received signal quality does not meet the signal quality criterion, and an application requirement of the application meets the first application requirement criterion.

8. The method of claim 1, further comprising:
instructing the wireless device to perform the initial access procedure with the access node using the second radio access technology when the received signal level does not the signal level criterion, the received signal quality does not meet the signal quality criterion, and an application requirement of the application meets the second application requirement criterion.

9. The method of claim 1, further comprising:
instructing the wireless device to perform the initial access procedure with the access node when the received signal level meets the signal level criterion, the received signal quality meets the signal quality criterion, and an application requirement of the wireless device meets one of the first application requirement criterion and the second application requirement criterion.

10. The method of claim 1, wherein the signal level criterion and the signal quality criterion are provided to the wireless device before a communication session is established between the wireless device and the access node.

11. A method of an access node selection for wireless communication, comprising:
providing a signal level criteria and a signal quality criterion from an access node to a wireless device;
determining a received signal level and a received signal quality based on a signal transmitted from an access node to a wireless device;
determining an application requirement of an application running on the wireless device;
instructing the wireless device to perform an initial access procedure with the access node using a first radio access technology when the received signal level meets the signal level criterion, the received signal quality does not meet the signal quality criterion, and the application requirement meets a first application requirement criterion; and
instructing the wireless device to perform the initial access procedure with the access node using a second radio access technology when the received signal level meets the signal level criterion, the received signal quality does not meet the signal quality criterion, and the application requirement meets a second application requirement criterion.

12. A system of an access node selection for wireless communication, comprising:
a processing node including a hardware processor and a storage, configured to:
provide a signal level criterion and a signal quality criterion from an access node to a wireless node, wherein the wireless node is capable of performing an initial access procedure with the access node using a first radio access technology and a second radio access technology;
determine a received signal level and a received signal quality based on a signal from the access node to the wireless node;
determine a first application requirement criterion and a second application requirement criterion of an application running on the wireless node; and
instruct the wireless node to perform the initial access procedure with the access node using the first radio access technology or the second radio access technology based on a comparison of the received signal level and the signal level criterion, a comparison of the received signal quality and the signal quality criterion, and the application requirement criteria.

13. The system of claim 12, wherein the processing node is further configured to:
instruct the wireless node to perform the initial access procedure with the access node using the first radio access technology when the received signal level meets the signal level criterion, the received signal quality does not meet the signal quality criterion, and an application requirement of the application meets the first application requirement criterion.

14. The system of claim 12, wherein the processing node is further configured to:
instruct the wireless node to perform the initial access procedure with the access node using the second radio access technology when the received signal level meets the signal level criterion, the received signal quality does not meet the signal quality criterion, and an application requirement of the application meets the second application requirement criterion.

15. The system of claim 12, wherein the processing node is further configured to:
instruct the wireless device to perform the initial access procedure with the access node using the first radio access technology when the received signal level does not meet the signal level criterion, the received signal quality meets the signal quality criterion, and the application requirement meets the first application requirement criterion.

16. The system of claim 12, wherein the processing node is further configured to:
instruct the wireless device to perform the initial access procedure with the access node using the second radio access technology when the received signal level does not meet the signal level criterion, the received signal quality meets the signal quality criterion, and an application requirement of the application meets the second application requirement criterion,
wherein the application running on the wireless device is a non-voice application.

17. The system of claim 12, wherein the processing node is further configured to:
- instruct the wireless device to perform the initial access procedure with the access node using the first radio access technology when the received signal level does not meet the signal level criterion, the received signal quality meets the signal quality criterion, and the application requirement meets the second application requirement criterion,
- wherein the application running on the wireless device is a voice application.

18. The system of claim 12, wherein the processing node is further configured to:
- instruct the wireless device to not perform the initial access procedure with the access node when the received signal level does not meet the signal level criterion, the received signal quality does not meet the signal quality criterion, and an application requirement of the application meets the first application requirement criterion.

19. The system of claim 12, wherein the processing node is further configured to:
- instruct the wireless device to perform the initial access procedure with the access node using the second radio access technology when the received signal level does not meet the signal level criterion, the received signal quality does not meet the signal quality criterion, and the application requirement meets the second application requirement criterion.

* * * * *